Sept. 6, 1966 S. T. FOWLER 3,270,461
PLANT PROTECTOR
Filed Aug. 3, 1964

INVENTOR.
SEEBER T. FOWLER
BY
Baldwin & Martin
ATTORNEYS

United States Patent Office 3,270,461
Patented Sept. 6, 1966

3,270,461
PLANT PROTECTOR
Seeber T. Fowler, Rte. 2, Box 116, Citra, Fla.
Filed Aug. 3, 1964, Ser. No. 387,078
12 Claims. (Cl. 47—2)

This invention relates to novel and improved means for protecting tender plants from the effects of low temperature and frost.

One of the difficulties encountered in the outdoor cultivation of tender plants in other than tropical climates is that the plants must be protected from the injury or destruction due to low temperature or frost. The term "plants" as used herein is means to embrace all types of vegetation including, without limitation thereto, trees, bushes and shrubs. It is of course known practice to cover small plants such as tomato plants to prevent injury due to frost. Such covers are usually free-standing, relative rigid structures fabricated of wood, paper, plastic, etc. While such covers are satisfactory as frost protectors for small plants, it is not practical to use such devices for protecting moderate size plants, for example up to 8 feet in height, as they would be too cumbersome, unwieldy and difficult to store when fabricated in such a size. Also, such covers do not in themselves provide adequate protection against freezing of the plant during sustained periods of low temperature.

It is further known to provide auxiliary heating means such as smudge pots and the like to protect larger plants, such as citrus trees, from sustained periods of low temperature. While such auxiliary heating means may be satisfactory for large commercial orchards, the installation and operating cost of such heating means make their use relatively impracticable by small nurseries or home-owners.

It is accordingly the object of this invention to provide novel and improved means for protecting tender plants from low temperature and frost which is suitable for use with small to moderate size plants; which is readily installed and removed; which when not being used is readily stored and requires little storage space; which is reusable; and which is relatively economical to fabricate and operate thus making it practical for use by small nurseries of homeowners.

The objects of this invention are achieved in a preferred embodiment comprising a tube of polyethylene open at both ends. The tube may be telescopically placed over a plant and the upper end gathered and tied to seal the top of the tube. A water inflatable bladder is provided integrally with the bottom of the tube. The bladder is fabricated by folding the lower end of the tue back within itself to provide a flap extending entirely around the tube. The flap is then secured to the side wall of the tube at locations spaced apart circumferentially of the tube and disposed intermediate the upper and lower ends of the flap. In this manner, the tube is provided with a water inflatable bladder at one end with the bladder having upwardly facing openings spaced about the tube and defined in part by the inside wall of the tube. A sprinkler or the like is placed on the ground within the tube and connected to a source of water. The sprinkler directs a continuous discharge of water upwardly for contact with the plant and the inside of the tube. As the water flows down the side of the tube it passes between next adjacent areas where the flap is secured to the tube and into the space between the flap and tube to inflate the bladder. The inflated bladder forms a substantially air-tight seal with the ground about the base of the plant and also anchors the bottom of the tube. The water spray, having a temperature substantially above the freezing point, will maintain the plant at a temperature above freezing even though the outside air may be the freezing point.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing, in which:

Figure 1:
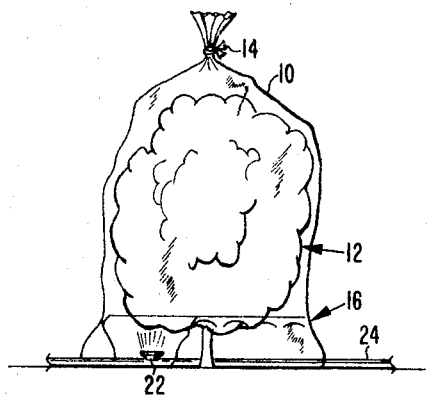
FIG. 1 is an elevational view, partly in section, of a plant protector constructed in accordance with the present invention and installed about a plant.
Figure 2:
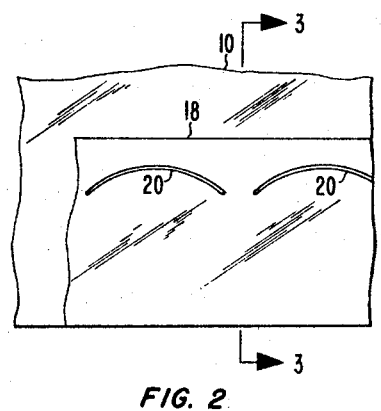
FIG. 2 is an enlarged, fragmentary view of a portion of the device of FIG. 1.
Figure 3:
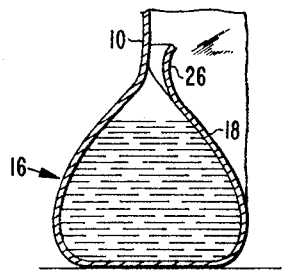
FIG. 3 is an enlarged, fragmentary, cross-sectional view substantially along the line 3—3 of FIG. 2.

With reference to the drawing and particularly FIGS. 1–3, the plant protection means of this invention comprises a tube generally indicated at 10. The tube 10 is open at both ends and is fabricated from a flexible, non-metallic material which is substantially impervious to air and water. The tube 10 is freely telescopically disposable over a plant such as generally indicated at 12. The tube should be of sufficient internal dimensions that it fits readily over the plant. The material from which the tube is fabricated should be sufficiently strong that it is not readily punctured by branches on the plant, while at the same time it should not be so heavy that its weight will injure the plant when the top of the tube rests upon the top of the plant. A satisfactory material for the tube 10 has been found to be polyethylene of approximately two mil thickness.

Figure 4:
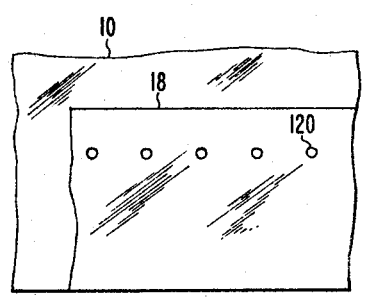
FIG. 4 is a fragmentary, elevational view illustrating an alternative structure.
Figure 5:
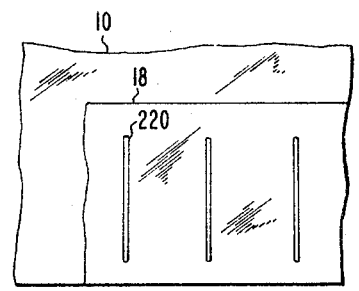
FIG. 5 is a fragmentary, elevational view illustrating a further modification.

The top of the tube is suitably sealed such as by gathering the tube together about the top of the plant 12. Suitable retaining means such as string or a short length of wire embedded in paper is engaged about the gathered end of the tube to maintain the upper end of the tube closed. A water inflatable bladder generally indicated at 16 is provided at the lower end of the tube 10. In the preferred embodiment shown, the bladder 16 is formed by folding or redirecting the lower end of the tube 10 back within itself to provide a reentrant portion or flap 18 which extends entirely about the lower end of the tube and a substantial distance toward the upper end of the tube. The flap 18 is secured to the tube 10, such as by heat sealing, at locations spaced apart in a direction generally circumferentially of the tube 10. More particularly, in the embodiment of FIG. 2, the flap is secured to the tube 10 along areas 20 which are disposed intermediate the upper and lower ends of the flap 18, with the next adjacent ends of each next adjacent pair of seal lines 20 being spaced apart a substantial distance in a direction circumferentially of the tube. The seal lines 20 are curved with their concave sides facing the bottom of the tube, whereby the next adjacent ends of each next adjacent pair of seal lines slope or incline toward each other and the bottom of the tube. The flap 18 may be secured to the tube 10 in any suitable manner such as through the use of adhesives or heat sealing and the areas of attachment between the flap and tube may have a configuration other than as shown in FIG. 2. For example, and as shown in FIG. 4, the flap 18 may be secured to the tube 10 along lines 120 extending generally longitudinally of the tube and spaced apart circumferentially thereof. Alternately, as shown in FIG. 5, the flap may be secured to the tube by tack heat sealing providing a plurality of relatively small tacks or seal areas 220 between the tube and flap with the tacks 220 being aligned and spaced apart generally circumferentially of the tube.

In use the tube 10 is assembled over a plant and the top of the tube is sealed such as heretofore described. If desired the upper end of the tube may be permanently sealed or have means other than that described for closing the top of the tube. However, for reasons which will be hereinafter apparent, it is preferred that it be possible to open the top of the tube. The tube is arranged longitudinally of the plant so that with the upper end of the tube supported on the top of the plant the bottom of the tube will more than reach the ground. A water discharge device 22, such as a sprinkler head or the like, is provided and rests on the ground within the tube. The sprinkler 22 is constructed or positioned to provide a spray or fine mist of water in an upward direction so that the water will contact the plant and will also contact the inside of the tube 10. As the water from the spray head 22 flows down the inside of the tube 10, it will flow into the openings in the bladder provided by the spacing of the seal areas joining the tube 18 and flap 10. The bladder 16 will fill to the point overflowing, whereby the bladder will be distended, as shown generally in FIGS. 1 and 3, to provide an air seal along the bottom of the tube where the bladder engages the ground. In this manner cold air outside the tube will be prevented from entering around the bottom of the tube. Also the water filled bladder being relatively heavy prevents the base of the tube from being displaced by winds and assures that once the tube is arranged about the plant as desired it will remain in that position. The pliable material from which the bladder is fabricated permits the bladder to conform itself about piping 24 or the like leading under the bladder and to and from the spray head 22. The piping 24 is used to connect the spray head 22 to a source of water and connects the spray head in series with other similar devices if desired.

Water is preferably continuously discharged from the spray head 22 during a period of low temperature. In this manner the temperature of the plant and the air within the tube 10 is maintained at a point substantially above freezing even though the outside air may be substantially below the freezing point. A further advantage of the continuous discharge of water from the spray head is that if the bladder 16 should develop a small leak, the continuous flow of water down the sides of the tube will maintain the bladder filled and effective for the purpose intended. Assuming that the bladder is watertight, once the bladder is filled the water flowing down the side of the tube will merely overflow the bladder and provide additional moisture for the ground about the plant.

As clearly shown in FIGS. 2, 4 and 5 the areas at which the flap 18 is joined to the tube 10 are spaced below the upper end of the flap a substantial distance. This provides a flexible lip 26 at the upper end of the flap which as clearly shown in FIG. 3 may flex inwardly of the tube when the tube is vertically arranged over a plant and water is flowing down the inside of the tube. The lip 26 forms a trough extending about the inside of the tube and top of the bladder which facilitates the collection of water flowing down the side of the tube and also may permit the collection of water falling closely adjacent but not along the inside of the tube. The portions of the lip 26 between the areas where the flap is secured to the tube may deflect inwardly of the tube somewhat farther than the portion of the flap in registry with the areas of attachment of the tube and flap. This will provide a general funnel-like entrance to the openings into the bladder 16. Where the flap and tube are sealed by seal lines such as illustrated in FIG. 2, wherein the seal lines have inclined ends, the funnel-like configuration of the entrance into the openings into the bladder is further enhanced.

When a period of low temperature has passed, the tube 10 may be removed from about the plant simply by unsealing the top of the tube and dropping it about the plant to collapse the bladder 16 whereupon the entire tube may be lifted over the plant. Under circumstances where there may be periods of low temperature alternating with periods wherein the temperature is high enough not to damage the plant, it may be desirable to leave the protector generally in position for immediate use if necessary. In such case the top of the tube 10 may merely be unsealed and the tube dropped about the base of the plant and left there until it is again needed. The sprinkler 22 may also be left in place for subsequent use or for intermediate use for irrigation purposes. While the invention has been described in connection with a water discharge device for continuously providing a discharge of water for contact with the plant and inside of the tube 10, the tube 10 may also if desired be used simply as a frost protector without the water discharge means being provided.

In this connection the tube 10 may be turned inside out wherein the flap 18 extends about the outside of the tube and the tube positioned about a plant such as shown in FIG. 1. The bladder 16 may then be filled with water either by introducing a nozzle directly between the flap 18 and tube 10 or by spraying the outside of the tube so that water running down the outside of the same will flow into the upwardly facing openings in the bladder.

The fabrication of the bladder 16 merely by folding one end of the tube back upon itself and attaching the redirected portion of the tube to the main body of the tube permits the plant cover or tube 10 to be simply and economically fabricated from a tube of polyethylene or the like which is readily available. The tube 10 when not in use may be flattened to a rectangular shape and then folded to a convenient size for ready storage requiring little space. The fabrication of the bladder 16 in the manner described results in the openings in the top of the bladder being defined in part by the side wall of the tube 10 next adjacent the flap 18. Accordingly water flowing down the side of the tube will readily flow into the upwardly facing openings in the bladder. The relatively light weight of the material from which the tube 10 is fabricated enables the tube to be supported by most plants about which is positioned without damage to the plant. However, in certain cases of very tender plants it may be desirable to support the tube on stakes or a frame disposed within the tube and about the plant.

While only certain preferred embodiments of this invention have been shown and described by way of illustration, many modifications will occur to those skilled in the art and it is, therefore, desired that it be understood that it is intended in the appended claims to cover all such modifications as fall within the true spirit and scope of this invention.

What is claimed as new and what is desired to secure by Letters Patent of the United States is:

1. Low temperature protection means for a plant comprising a tube of flexible non-metallic material substantially impervious to water, said tube having a water inflatable ground engageable bladder extending around one end thereof, and means providing a plurality of openings in said bladder facing generally toward the other end of the tube and defined in part by a side of said tube whereby water flowing along said side of the tube towards said one end thereof may enter said openings to inflate said bladder.

2. Low temperature protection means for a plant comprising a tube of flexible non-metallic material substantially impervious to water, and a water inflatable ground engageable bladder extending around one end of said tube, said bladder being formed by a flap extending in watertight relation from said one end of the tube toward the other end thereof and extending entirely about the tube, said flap being secured to the tube at locations spaced apart in a direction circumferentially of the tube whereby water flowing down the side of the tube next adjacent said flap may enter the space between said flap and tube.

3. Means for protecting a plant against low temperatures comprising a tube of flexible non-metallic material substantially impervious to water, at least one end of the tube being open, said tube being redirected back upon itself at said one end thereof to provide a redirected portion extending around the tube and a substantial distance from said one end toward the other end of the tube, said redirected portion being secured to the tube at locations spaced apart in a direction circumferentially about the tube and spaced inwardly of said one end of the tube to provide a water inflatable bladder having openings facing toward the other end of the tube and defined in part by said tube whereby water flowing along the side of the tube next adjacent said redirected portion may enter said bladder.

4. Means for protecting a plant against low temperatures comprising a tube of flexible non-metallic material substantially impervious to water, at least one end of the tube being open, said tube being redirected back upon itself at least one end thereof to provide a redirected portion extending around the tube and a substantial distance from said one end toward the other end of the tube, said redirected portion being secured to the tube at locations spaced apart in a direction circumferentially about the tube and spaced between the ends of the flap to provide a water inflatable bladder having openings on the side thereof facing said other end of the tube, the portion of said redirected portion disposed between said locations and the end of the flap next adjacent said other end of the tube forming a flexible lip deformable inwardly of the tube to provide a water collecting trough extending about the tube and communicating with said openings.

5. A plant protector comprising a tube of flexible non-metallic material substantially impervious to water, at least one end of said tube being open, said tube being folded back within itself at said one end to provide a reentrant portion extending around the tube and a substantial distance from said one end toward the other end of the tube, the reentrant portion being sealed to the tube at locations spaced apart circumferentially about the tube to provide a water inflatable bladder at said one end of the tube and having openings facing outwardly thereof towards the other end of the tube.

6. A plant protector comprising a tube of flexible non-metallic material substantially impervious to water, at least one end of the tube being open, said tube being redirected back upon itself at said one end to provide a redirected portion extending around the tube, said redirected portion being interruptingly sealed to the tube along lines extending in a direction generally circumferentially of the tube, the seal lines being disposed intermediate the ends of the redirected portion, the next adjacent portions of at least some next adjacent pairs of seal lines being inclined toward each other and said one end of the tube.

7. A plant protector comprising a tube of flexible non-metallic material substantially impervious to water, at least one end of said tube being open, said tube having an integral flap at said one end disposed within the tube and extending from said one end toward said other end and entirely about the axis of the tube, the flap being sealed to the tube along lines disposed intermediate the ends of the flap and spaced apart generally circumferentially of the tube, the seal lines each being inclined at each end thereof toward said one end of the tube to provide a funnel-like entrance into the space between the next adjacent ends of next adjacent pairs of seal lines.

8. A plant protector comprising a tube of flexible non-metallic material substantially impervious to water, said tube being open at both ends, the tube being disposable over a vertically extending plant whereby one end of the tube is next adjacent the ground and the other end of the tube is disposed above the plant, said tube being provided with a water inflatable bladder extending around said one end of the tube and engageable with the ground, said bladder being formed in part by said tube and having openings facing the other end of the tube and defined in part by the tube, the other end of the tube being capable of being closed by gathering the tube together, and means for engagement about the gathered portion of the tube to maintain said other end of the tube closed.

9. Plant protection means comprising a tube of flexible non-metallic material substantially impervious to water and open at one end, said tube being disposable telescopically over a plant with said one end thereof next adjacent the ground, means providing a water inflatable bladder at said one end of the tube formed in part by said tube and having openings on the side thereof opposite said one end of the tube and facing said other end of the tube, said openings being within said tube and defined in part by the tube, and water discharge means for disposition within the tube and for providing an upwardly directed discharge of water for contact with a plant enclosed within the tube and for contact with the inside of the tube.

10. Means for protecting plants comprising a tube of flexible non-metallic material substantially impervious to water, said tube being open at both ends and being telescopically disposable over a vertically extending plant with one end of the tube next adjacent the ground and the other end of the tube disposed above the plant, the other end of the tube being sealable by gathering together the tube adjacent said other end thereof, means for engagement about the gathered portion of the tube to hold the same tightly gathered, said one end of the tube being redirected inwardly of the tube to provide a reentrant portion extending entirely about the tube and within the same, the reentrant portion being discontinuously sealed to the tube in a plurality of areas spaced apart circumferentially about the tube to provide a water inflatable bladder at said one end of the tube with said bladder having openings defined in part by the tube and facing toward the other end of the tube, and means for providing an upwardly directed discharge of water engageable at least in part with the inside of the tube to provide a flow of water downwardly along the inside of the tube and into said openings to inflate said bladder, said bladder when inflated being engageable with the ground to provide an air seal around the bottom of the plant enclosed by the tube.

11. Plant protection means comprising a flexible non-metallic tube substantially impervious to water and open at both ends, said tube being telescopically disposable over a vertically extending plant with one end thereof disposed next adjacent the ground about the plant and the other end thereof disposed over the plant, means for closing said other end of the tube, said one end of the tube being provided with an integral flap extending entirely around the tube and disposed within the tube, said flap being secured to the tube at areas disposed intermediate the ends of the flap and spaced apart in a direction generally circumferentially of the tube to provide a water inflatable ground engageable bladder at said one end of the tube having openings facing said other end of the tube, the portion of said flap between said areas and said other end of the tube providing a flexible lip deformable inwardly of the tube to provide in conjunction with the side of the tube or trough extending about the tube and facing said other end of the tube, and water discharge means for location within the tube to provide a discharge of water toward said other end of the tube for contact at least in part with the inside of the tube.

12. Plant protection means comprising a tube of flexible non-metallic material substantially impervious to water, one end of the tube being disposed above the plant, a ground engageable water inflatable bladder extending around the other end of the tube, said bladder being formed by the tube and an integral reentrant flap on the tube extending toward the other end thereof, means providing the bladder with a plurality of upwardly facing openings defined in part by the inner side wall of said tube whereby water flowing down the inner side wall of the tube may enter the bladder to inflate the same, water discharge means disposed within the tube for directing water upwardly for engagement with the plant and the inner side wall of the tube, and means for releasably closing said other end of the tube whereby said other end of the tube may be opened when desired to permit said other end of the tube to be moved downwardly over the plant so as to expose the plant to ambient conditions.

References Cited by the Examiner

UNITED STATES PATENTS 1,437,149    11/1922    Minetti _____ 47—2
3,206,892    9/1965    Telkes et al. _____ 47—29

ABRAHAM G. STONE, *Primary Examiner.*

R. E. BAGWILL, *Assistant Examiner.*